(12) United States Patent
Tolley (10) Patent No.: US 11,698,039 B2
(45) Date of Patent: *Jul. 11, 2023

(54) ENGINE SYSTEM (71) Applicant: J. C. Bamford Excavators Limited, Uttoxeter (GB)

(72) Inventor: Alan Tolley, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,698

(22) Filed: Feb. 25, 2022

(65) Prior Publication Data

US 2022/0298984 A1 Sep. 22, 2022

Related U.S. Application Data (63) Continuation of application No. 16/709,858, filed on Dec. 10, 2019, now Pat. No. 11,293,362.

(30) Foreign Application Priority Data

Dec. 10, 2018 (GB) ...................... 1820068

(51) Int. Cl.
*F02D 41/02* (2006.01)
*B60L 1/08* (2006.01)
(Continued)

(52) U.S. Cl.
CPC ............ *F02D 41/0255* (2013.01); *B60L 1/08* (2013.01); *B60W 10/26* (2013.01); *F01N 3/2013* (2013.01);
(Continued)

(58) Field of Classification Search
CPC .. F02D 41/0255; F02D 2041/026; B60L 1/08; B60W 10/26; B60W 20/13;
(Continued)

(56) References Cited

U.S. PATENT DOCUMENTS 5,390,488 A 2/1995 Ament et al.
5,428,955 A 7/1995 Yuuki et al.
(Continued)

FOREIGN PATENT DOCUMENTS

EP 2 806 127 A1 11/2014
EP 3406871 A1 11/2018
(Continued)

OTHER PUBLICATIONS

Search Report for GB1820068.3, dated May 30, 2019.
(Continued)

*Primary Examiner* — Brandon D Lee
(74) *Attorney, Agent, or Firm* — Marshall, Gerstein & Borun LLP (57) ABSTRACT

An engine system for an off-highway vehicle includes a diesel engine configured to drive a driveline of the vehicle; an after-treatment arrangement configured to reduce emissions from the engine system; an after-treatment heating element configured to raise an operating temperature of the after-treatment arrangement; an electric energy storage device; and a controller configured to direct energy from the electric energy storage device to the after-treatment heating element in order to raise the operating temperature of the after-treatment arrangement.

18 Claims, 7 Drawing Sheets

(51) Int. Cl.
  *F01N 3/20* (2006.01)
  *F02N 19/02* (2010.01)
  *B60W 10/26* (2006.01)
  *F02N 19/10* (2010.01)
  *B60W 20/13* (2016.01)

(52) U.S. Cl.
  CPC ............ *F02N 19/02* (2013.01); *B60W 20/13* (2016.01); *F02D 2041/026* (2013.01); *F02N 19/10* (2013.01)

(58) Field of Classification Search
  CPC ...... B60W 20/16; F01N 3/2013; F01N 3/206; F01N 9/00; F01N 2590/08; F01N 2590/11; F01N 2900/1602; F01N 3/027; F01N 2240/16; F02N 19/02; F02N 19/10; Y02A 50/20; Y02T 10/12; Y02T 10/40
  See application file for complete search history.

(56) References Cited

U.S. PATENT DOCUMENTS

| | | |
|---|---|---|
| 2008/0223019 A1 | 9/2008 | Gonze et al. |
| 2008/0275600 A1* | 11/2008 | Rask ................... B60K 6/485 701/22 |
| 2008/0295493 A1 | 12/2008 | Applegate et al. |
| 2009/0183496 A1* | 7/2009 | Arakawa ............... F01N 3/0842 60/299 |
| 2010/0276223 A1* | 11/2010 | Gonze ................. B60W 10/06 180/309 |
| 2010/0280698 A1 | 11/2010 | Ichikawa |
| 2012/0255279 A1 | 10/2012 | Atluri et al. |
| 2013/0213010 A1 | 8/2013 | Zhang et al. |
| 2013/0276434 A1 | 10/2013 | Andersson et al. |
| 2016/0153335 A1* | 6/2016 | Itoh ....................... F01N 3/2066 422/109 |
| 2016/0311304 A1* | 10/2016 | Niwa ....................... B60K 6/28 |
| 2017/0234285 A1* | 8/2017 | Huh .................... F02N 11/0803 123/179.4 |
| 2017/0320483 A1 | 11/2017 | Ishihara et al. |
| 2018/0291784 A1 | 10/2018 | Achenback et al. |
| 2019/0276004 A1* | 9/2019 | Takasu ................... F02D 23/02 |
| 2019/0308490 A1* | 10/2019 | Obuchi ................... B60H 1/034 |
| 2020/0263591 A1* | 8/2020 | Matsumura ............. F02D 43/00 |

FOREIGN PATENT DOCUMENTS

| | | |
|---|---|---|
| EP | 3476680 A1 | 5/2019 |
| FR | 2878899 A1 | 6/2006 |
| JP | H09125939 A | 5/1997 |
| JP | H10169433 A | 6/1998 |
| JP | 2010236544 A | 10/2010 |
| WO | WO-2010/050857 A1 | 5/2010 |

OTHER PUBLICATIONS

Extended European Search Report for EP 19214461.6, dated Feb. 14, 2020.
Search Report for GB 1910753.1, dated Jan. 21, 2020.
Further Search Report for GB 19190753.1, dated Jul. 14, 2020.
Extended European Search Report for EP 20187712.3—, dated Oct. 21, 2020.
Search Report for GB 1820068.3, dated May 31, 2019.
Extended European Search Report issued in European Patent Application No. 22202479.6, dated Nov. 11, 2022.

* cited by examiner

ENGINE SYSTEM

FIELD OF THE INVENTION

The present disclosure relates to an engine system and an off-highway vehicle comprising said engine system. More particularly, though not exclusively, the present disclosure relates to an engine system configured to reduce emissions from an off-highway vehicle.

BACKGROUND OF THE INVENTION

Off-highway vehicles use, almost exclusively, combustion engines to provide the energy and power required for operation. Whilst these engines can be efficient and cost effective they emit exhaust pollutants (hydrocarbons, nitrogen oxides and particulate matter), which can be detrimental to health and to the environment.

Various abatement technologies are known for diesel engines, which may be used alone or in combinations, to reduce these harmful emissions. These technologies include the following:

Diesel particulate filters (DPF) are provided to remove particulate matter from engine exhausts. As the particulate matter may accumulate in the filter causing blockages, mechanisms are required to clean the filter. Passive filters use a catalyst to remove accumulations, but need high temperatures to work. This cannot be guaranteed for off-highway applications, because the engine may spend a significant time idling, such that sufficient temperatures may not be achieved passively. An "active" DPF is therefore desirable for the technology to be effective in off-highway applications. Active DPFs periodically burn fuel, either in a fuel burner, or by using the engine management system to increase exhaust temperature by changing the fuel injection strategy to heat the filter to particulate matter combustion temperatures. High reductions in particulate matter are achievable (over 99% in optimal conditions). Disadvantages of active DPFs include an increased specific fuel consumption.

Selective catalytic reduction (SCR) combines the use of a catalyst such as vanadium, tungsten, copper zeolite (Cu-Zeolite), or iron zeolite (Fe-Zeolite) with a reductant such as anhydrous ammonia, aqueous ammonia, or more typically, urea, to convert NO and $NO_2$ to nitrogen and water. Urea is typically used as the reductant, but has to be injected into the exhaust somewhat upstream of the SCR catalyst in order to thermally decompose into ammonia by the point at which it enters the SCR catalyst. Urea is preferred over ammonia, as it substantially safer to store and transport. In the USA, commercially available urea for use with SCRs is referred to as Diesel Exhaust Fluid (DEF), whereas in Europe it is referred to as "AdBlue®". For SCRs to function effectively at the lower end of the temperature spectrum it has hitherto been desirable for there to be a 50:50 split of NO and $NO_2$, although Cu-Zeolite catalysts have been found to improve performance at temperatures of less than 300° C. when there is little $NO_2$ available. An advantage of SCR is that it has minimal impact of specific fuel consumption. On the downside, there is a risk that excess injection of urea reductant, or that ammonia resident in the SCR catalyst at lower temperatures and released as the catalyst heats, causes unreacted ammonia to be emitted from the SCR into the atmosphere. This is referred to in the industry as "ammonia slip".

Such emissions control devices can be very effective at removing emissions (in excess of 99%), but require optimal operating conditions to be effective.

Accordingly, the present disclosure seeks to overcome, or at least mitigate the problems of the prior art. For example, the present disclosure seeks to reduce the emission of exhaust pollutants from off-highway vehicles, e.g. close to zero.

SUMMARY OF THE INVENTION

A first aspect of the invention provides an engine system for an off-highway vehicle, comprising:
a diesel engine configured to drive a driveline of the vehicle;
an after-treatment arrangement configured to reduce emissions from the engine system;
an after-treatment heating element configured to raise an operating temperature of the after-treatment arrangement;
an electric energy storage device; and
a controller configured to direct energy from the electric energy storage device to the after-treatment heating element in order to raise the operating temperature of the after-treatment arrangement.

In this way, the after-treatment system can be maintained at an optimal operating temperature in which emissions from the engine system are most effectively reduced. This has the advantage of reducing harmful emissions from the engine system (e.g. $NO_x$ and particulate matter). As will be described in further detail below, emissions from an off-highway machine, including such an engine system, may be sufficiently low to be considered to be "zero", enabling use of engine systems in "Zero Emission Zones". This is achievable whilst providing the efficiency, range and cost of a hydrocarbon fuelled combustion engine equipped vehicle.

After-treatment systems, such as SCR and DPF systems can achieve up to 99.9% efficiency under specific conditions, for example, under specific temperature conditions. For example, when an SCR arrangement is cold, $NO_x$ emissions may be high e.g. at about 500 ppm. Whereas, in the case of a Cu-Zeolite catalyst, when the SCR reaches a temperature of about 300° C., $NO_x$ emissions are reduced to approximately zero. Accordingly, by heating the after-treatment arrangement, greatly reduced $NO_x$ emissions are achieved. The performance of an SCR is highly dependent on temperature.

Further, passive DPFs are temperature dependent. Therefore, by heating the after-treatment arrangement, the proportion of passive DPF regeneration which is possible is increased. This reduces the need for "active" regeneration of the DPF, which would require additional burning of fuel to remove accumulated particulate matter. Therefore, decreased fuel consumption is achieved. The after-treatment heating element can also be used as part of the active regeneration of the DPF, where necessary and desirable.

In this way, by heating the after-treatment arrangement, reduced or negligible emissions are produced from the engine system, whilst still achieving the efficiency and cost benefits associated with diesel engines. In particular, reduced or negligible emissions are produced at a much lower cost than a purely electric engine system.

The EU stage V exhaust emissions standards will come into force on Jan. 1, 2019, for engines below 56 kW and above 130 kW. They will take effect a year later, on Jan. 1, 2020, for engines in the 56 to 129 kW range. Regulation 2016/1628 specifies emission requirements for all categories of compression ignition (diesel) and positive ignition mobile non-road engines, replacing Directive 97/68/EC and its amendments. It has been found that, by using the engine system disclosed herein, it is possible to achieve emissions many times lower than the Stage V standard.

Further, emissions at the point of use are sufficiently low as to be insignificant and classified as "zero", enabling use of engine systems in "Zero Emission Zones".

By way of example, the engine system disclosed herein is advantageous in reducing emissions upon vehicle start-up. In such instances, the electric energy storage device can be used provide energy to the after-treatment heating element in order to raise the operating temperature of the after-treatment arrangement to a temperature where the efficiency is optimised. Accordingly, there is no requirement to start the diesel engine in order to heat the after-treatment arrangement. In this way, emissions can be reduced from engine start-up, and throughout use of the engine.

In some embodiments, the off-highway vehicle is a hybrid energy off-highway vehicle.

Optionally, the system further comprises an engine heating element configured to heat the diesel engine, wherein the controller is configured to direct energy from the electric energy storage device to the engine heating element in order to raise the temperature of the diesel engine.

In exemplary embodiments, the engine is heated by heating the coolant and/or oil and/or air inducted into the engine. For example, the oil and/or coolant may be heated to a temperature in the range of 40–80° C., e.g. about 60° C. For example, the inducted air may be heated to a temperature in the range of 10–40° C., e.g. about 25° C.

Again by way of example, the engine system disclosed herein is advantageous in reducing emissions upon vehicle start up. In such instances, the electric energy storage device can be used to provide energy to the engine heating element in order to raise the temperature of the diesel engine, for example an optimal operating temperature at which emissions are reduced. Therefore, the engine can be preheated prior to starting the engine. This means that the engine does not need to be run in before it gets up to temperature.

Optionally, the system is configured to heat the after-treatment arrangement and/or the engine prior to the controller directing the diesel engine to drive the driveline.

In this way, when the after-treatment system and/or the diesel engine are up to temperature, the engine is started and used to drive the driveline. This ensures that emissions will be minimised right from the point of engine start up.

Optionally, after the controller directs the diesel engine to drive the driveline, the controller directs the electric energy storage device to cease supply of energy to the after-treatment heating element and/or the engine heating element.

In most circumstances, temperature of the after-treatment system and/or the engine is maintained by virtue of operation of the engine itself.

Optionally, the controller directs the electric energy storage device to gradually cease supply of energy to the after-treatment heating element and/or the engine heating element In some circumstances, the supply of energy to heat the after-treatment arrangement may be stopped prior to or after the supply of energy to heat the engine is stopped. In this way, heating can be tailored so that the required temperature of the after-treatment arrangement and/or the engine is maintained.

Optionally, the system further comprises a motor generator configured to drive the driveline of the vehicle, such that the engine system is configured to drive the driveline of the vehicle via the motor generator in an electric mode, via the diesel engine in an engine mode, or a combination of both modes.

In this way, the driveline of the vehicle can be operated when the engine has not yet been started by using the motor generator to drive the driveline of the vehicle. This means that the vehicle may still be used whilst the engine and/or the after-treatment arrangement are being brought up to temperature.

This also has the advantage that, under very high load demands, both the diesel engine and the motor generator can be used to drive the driveline of the vehicle.

In other circumstances, where there is a low load demand on the vehicle, the driveline of the vehicle may be driven only using the motor generator.

Optionally, prior to and/or during heating of the after-treatment arrangement and/or the engine, the controller directs energy from the electric energy storage device to the motor generator to drive the driveline in the electric mode.

In this way, the vehicle can still be used by using the motor generator to drive the driveline of the vehicle whilst the after-treatment system and/or the engine are getting up to temperature. This means that use of the vehicle is not impeded, whilst still ensuring minimal or zero emissions are produced by the vehicle.

Optionally, upon receipt of an input corresponding to a request to start the vehicle, the controller directs energy from the electric energy storage device to the motor generator to drive the driveline in the electric mode.

This ensures that the engine is not started until it is determined that a sufficient load demand has been placed on the vehicle and so ensures that the engine is not started unnecessarily. Further, this ensures that the engine is only started once the engine and after-treatment arrangement have been brought up to temperature.

Optionally, the system is configured to determine a load demand on the system, wherein, when the system is running in electric mode, if the demand is determined to be below a lower load threshold, then the controller directs the system to continue to drive the driveline in the electric mode.

In exemplary embodiments, the lower load threshold may be 10-30%, e.g. 20%.

In other words, where a low load demand has been placed on the vehicle, the engine system is configured to drive the driveline in the electric mode and so not start the engine. The engine will therefore only be started when the load demands are great enough to necessitate this. Accordingly, unnecessary use of the engine is avoided.

Additionally, when the engine is running at a light load demand, exhaust gases from the engine will be at a relatively low temperature and so the temperature of the after-treatment arrangement will not be optimal for minimising emissions. Accordingly, running in the electric mode avoids the engine system running in non-clean modes.

Optionally, the controller is configured to direct the system to switch from the electric mode to the engine mode, wherein switching from the electric mode to the engine mode comprises:

pre-heating the after-treatment arrangement and/or the engine, and following pre-heating, the controller is configured to cause the engine to drive the driveline in the engine mode.

Advantageously therefore, the engine system is only switched from electric mode to engine mode when the after-treatment arrangement and/or the engine have been brought up to temperature e.g. met a respective predetermined temperature. In this way, the use of the engine is limited to when emissions can be most effectively reduced i.e. when the after-treatment arrangement and/or the engine are operating at an optimal temperature. Further, the vehicle can be used in either electric mode or engine mode, to optimise emission levels, without interfering with the use of the vehicle.

Optionally, the pre-heating the after-treatment arrangement and/or the engine comprises the controller directing energy from the electric energy storage device to the after-treatment heating element and/or the engine heating element for a respective pre-determined time period.

In exemplary embodiments, the respective pre-determined time period is selected to correspond to the time period required for the engine and/or the after-treatment system to reach a respective predetermined temperature.

Optionally, the pre-heating the after-treatment arrangement and/or the engine comprises the controller directing energy from the electric energy storage device to the after-treatment heating element and/or the engine heating element until the after-treatment arrangement and/or the engine reach a pre-determined temperature.

Optionally, the system is configured to determine a load demand on the system, and wherein, when the system is running in electric mode, if the demand is above the or a lower load threshold, the controller directs the system to switch from the electric mode to the engine mode.

Therefore, the engine is only started when the load demand is great enough to require it. When the demand is greater than a lower load threshold, the engine is then started since this is more efficient for such loads.

Optionally, when the system is running in electric mode, if the amount of charge in the electric energy storage device is below a first predetermined amount, the controller directs the system to switch from the electric mode to the engine mode.

In exemplary embodiments, the first predetermined amount is between 10-50%, e.g. 20%. This ensures that there is sufficient power to drive the driveline of the vehicle. Further, in such instances, the engine may be directed by the controller to also charge the electric energy storage device, via the motor generator, and so increase the load demand on the system e.g. to above the lower load threshold.

Optionally, the system is configured to determine an operating temperature of the after-treatment system and, when the system is operating in the engine mode, when the operating temperature is determined to be decreasing and/or when the operating temperature determined to have reached a pre-determined minimum temperature, the controller is configured to direct the engine to also provide mechanical energy to the motor generator, for conversion to electrical energy and storage in the electric energy storage device.

For example, if the load demand on the system is not very high, the operating temperature of the after-treatment system may decrease. Therefore, by directing the diesel engine to also charge the electric energy storage device, the load demand on the engine is increased and so the temperature of exhaust gases produced is also increased. This raises the operating temperature of the after-treatment arrangement.

Optionally, when the system is operating in the engine mode, when the operating temperature is determined to be decreasing and/or when the operating temperature determined to have reached a pre-determined minimum temperature, and when the amount of charge in the electric energy storage device is determined to be above a second predetermined amount, the controller directs the system to run in the electric mode.

In exemplary embodiments, the second predetermined amount is between 50-100%, e.g. 90%.

In this way, when the operating temperature of the after-treatment arrangement is likely to fall to below an optimal temperature, and therefore fall outside the optimal operating conditions, the engine is stopped so to ensure that emissions are kept to a minimum. In the meantime, the vehicle is run in the electric mode.

Optionally, the operating temperature of the after-treatment arrangement is determined based on a temperature of the exhaust gases from the diesel engine.

Optionally, the system is configured to determine a load demand on the system, and wherein if the demand is above an upper load threshold, the controller directs the system to run in both the electric mode and the engine mode.

This ensures that there is sufficient power to meet high load demands. For example, the upper load threshold is above the load demand which can be satisfied by the engine alone.

Optionally, the system is configured to determine an amount of charge in the electric energy storage device, and wherein when the system is running in the engine mode and upon receipt of an input corresponding to a request to stop the vehicle:

if the amount of charge is above a third predetermined amount, the controller directs the engine to switch off; and if the amount of charge is below a third predetermined amount, the controller directs the engine to keep running to provide mechanical energy to the motor generator, for conversion to electrical energy and storage in the electric energy storage device.

In exemplary embodiments, the third predetermined amount is between 50-100%, e.g. 90%.

This ensures that there is sufficient charge in the electric energy storage device when the vehicle is started up again at a later time. This ensures that the vehicle will be able to operate whilst keeping emissions to a minimum.

Optionally, the motor generator is configured to generate electrical energy from engine overrun and/or vehicle braking and transfer this to the electric energy storage device.

Optionally, the controller is configured to direct energy to the after-treatment heating element and/or to the engine heating element upon receipt of an input corresponding to a request to start the vehicle.

Upon vehicle start-up, the after-treatment arrangement and/or the engine are likely to be at a relatively low temperature and so the system may act to immediately increase these temperatures to enable the engine to be started as soon as possible.

Optionally, the system is configured to determine an operating temperature of the after-treatment arrangement and/or an engine temperature of the diesel engine, wherein, when the determined operating temperature of the after-treatment system and/or the determined engine temperature meet a respective predetermined threshold, the controller directs the diesel engine to drive the driveline.

Optionally, the after-treatment arrangement comprises a Diesel Particular Filter (DPF) and/or a Selective Catalytic Reduction (SCR) arrangement, optionally wherein the after-treatment heating element is configured to raise the operating temperature of the after-treatment arrangement by heating an exhaust from the diesel engine and/or by heating an SCR catalyst.

Optionally, heating the engine comprises heating a coolant and/or an oil and/or air inducted into the engine.

A second aspect of the invention provides an off-highway vehicle comprising the engine system of as disclosed herein.

BRIEF DESCRIPTION OF THE DRAWINGS

Embodiments disclosed herein will now be described, by way of example only, with reference to the accompanying drawings, in which.

DETAILED DESCRIPTION

Figure 1:
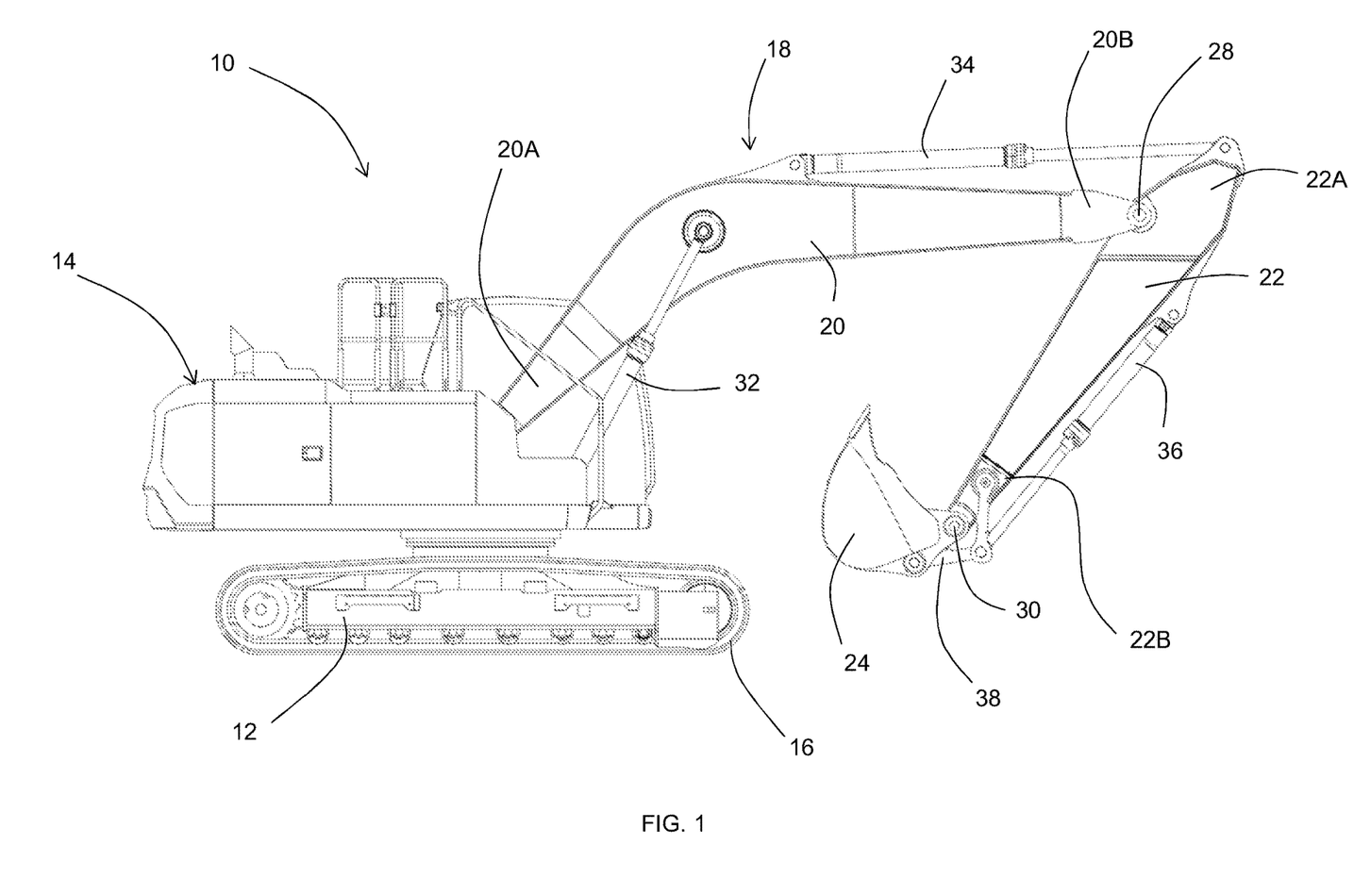
FIG. 1 illustrates an off-highway vehicle in accordance with an embodiment of this disclosure.

With reference to FIG. 1 there is shown an off-highway vehicle 10, e.g. an excavator, including a chassis 12 and a superstructure 14 carrying an operator station from which an operator can control the vehicle. The superstructure 14 is mounted on the chassis 12. Ground engaging transport means in the form of a pair of tracks 16 are provided on the chassis 12 to move the machine over the ground.

Off-highway vehicles are for example those used in construction industries (e.g. backhoe loaders, slew excavators, telescopic handlers, forklifts, skid-steer loaders, dump trucks, bulldozers, graders), agricultural industries (tractors, combine harvesters, self-propelled harvesters and sprayers), quarrying (e.g. loading shovels, aggregate crushing equipment), and forestry (timber harvesters, feller bunchers).

Attached to the vehicle superstructure 14 is an arm assembly 18, the arm assembly includes a first arm in the form of a boom 20, a second arm in the form of a dipper 22 and a ground engaging implement in the form of a bucket 24. The boom 20 is pivotally mounted to the frame 14 at a first end 20A by a pivot (not shown). The dipper 22 is pivotally mounted via pivot 28 to a second end 20B of the boom 20. Pivot 28 is orientated horizontally. The bucket is pivotally mounted via pivot 30 to an end 22B of dipper 22 remote from end 22A of dipper 22. Pivot 30 is orientated horizontally.

A first hydraulic actuator in the form of a first hydraulic ram 32 has a first end pivotally attached to the superstructure 14 and a second end pivotally attached to the boom 20 part way between the first and second ends of the boom. A second hydraulic actuator in the form of a second hydraulic ram 34 has a first end pivotally attached to the boom 20 part way between the first and second ends of the boom and a second end pivotally attached to the dipper 22 proximate the first end of the dipper. A third hydraulic actuator in the form of a third hydraulic ram 36 has a first end pivotally attached to the dipper 22 proximate the first end of the dipper 22 and a second end pivotally attached to a linkage mechanism 38 proximate the second end of the dipper. The linkage mechanism 38 per se is known and simply converts extension and retraction movement of the third hydraulic ram 36 into rotary movement of the bucket 24 about pivot 30.

Extension of the first hydraulic ram 32 causes the boom 20 to raise, and contraction of the first hydraulic ram 32 causes lowering of the boom 20. Extension of the second ram 34 causes the dipper 22 to pivot in a clockwise direction (when viewing FIG. 1) about pivot 28, i.e. causes the boom to move in a "dipper in" direction, and retraction of the second hydraulic ram 34 causes the dipper 22 to move in an anticlockwise direction when viewing FIG. 1 about pivot 28, i.e. in a "dipper out" direction. Extension of the third hydraulic ram 36 causes the bucket 24 to move in a clockwise direction about pivot 30, i.e. in a "crowd" direction, and retraction of the third hydraulic ram 36 causes the bucket to move in an anticlockwise direction about pivot 30, i.e. in a "dump" direction.

Figure 2:
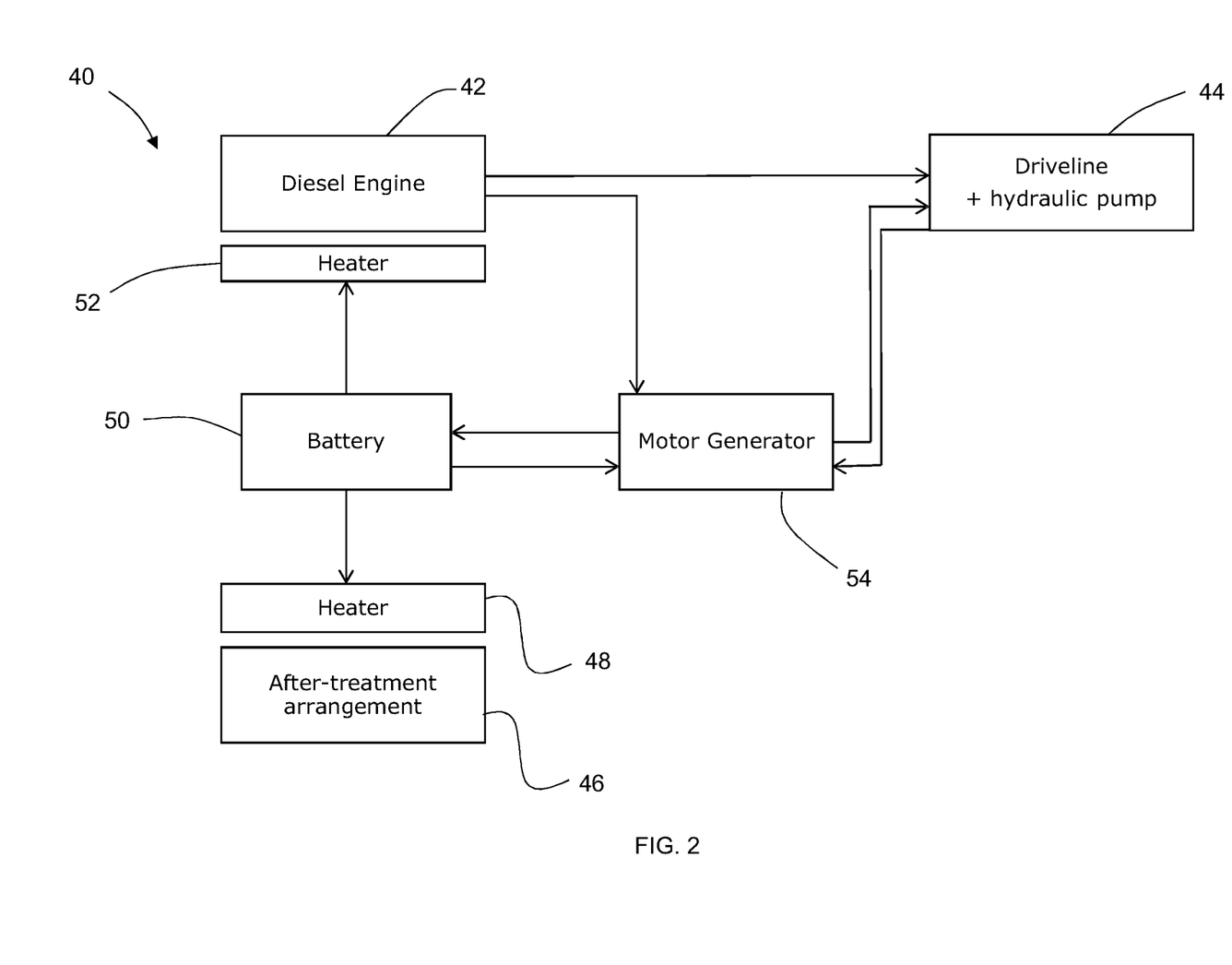
FIG. 2 illustrates a schematic of an engine system in accordance with an embodiment of this disclosure.

With reference to FIG. 2, the off-highway vehicle 10 includes an engine system 40 configured to deliver power to the vehicle 10. The system includes a diesel internal combustion engine 42, which is arranged to provide power to the tracks 16 via a suitable transmission and driveline 44. The engine 42 is also arranged to power a hydraulic pump 44, linked to operator controls to enable the operator to selectively supply hydraulic fluid to one or more of the hydraulic rams 32, 34, 36 to manipulate the working arms and thereby perform working operations.

The engine 42 of the engine system is one physically designed and whose engine management system is programmed to minimise particulate and $NO_x$ emissions. Engines of this type are referred to as "clean combustion" engines.

An example of an engine of this type is the applicant's series of engines offered under the Dieselmax® and Ecomax® brands. These engines have capacities of 3.0, 4.4 and 4.8l in four cylinder versions and 7.2l in six cylinder versions. The engines are four stroke, have four or six cylinders, and have a range of power outputs between 55 kW and 212 kW. The engines utilise common rail fuel injection, with optimised injector nozzle characteristics to enhance fuel atomisation and therefore burn, as well as variable geometry turbochargers, all of which contribute to low engine exhaust emissions.

The engine system 40 also includes an after-treatment arrangement 46 configured to reduce emissions, e.g. $NO_x$ and particular matter, from the system. In exemplary embodiments, the after-treatment arrangement 46 includes SCR and DPF elements (not shown). An after-treatment heating element 48 is provided which is configured to raise an operating temperature of the after-treatment arrangement 46.

The engine system 40 includes a battery 50, or other suitable electric energy storage device (such as a capacitor or combination of battery and capacitor), and a controller (not shown) arranged to control the supply of energy in the engine system 40. In particular, the controller is configured to direct energy from the battery 50 to the after-treatment heating element 48 in order to raise the operating temperature of the after-treatment arrangement 46.

In exemplary embodiments, the after-treatment heating element 48 comprises a first heating element for heating the SCR catalyst and/or a second heating element provided in an exhaust pipe from the engine and configured to heat exhaust gases from the engine 42. In some embodiments, the SCR may be heated first, followed by heating of the exhaust. In some embodiments, the exhaust is heated when or just before the engine starts running.

In exemplary embodiments, the SCR catalyst is a Cu-Zeolite catalyst and the system is configured to raise the temperature of the catalyst to a temperature in the range of 250-350° C., for example 300° C. The temperature to which the catalyst is heated depends on the particular material of the catalyst used.

In exemplary embodiments, the system is configured to heat the exhaust gases such that the gas inlet temperature to the SCR is approximately 150-250° C., e.g. 200° C.

Again with reference to FIG. 2, the engine system 40 includes an engine heating element 52 which is configured to heat the diesel engine 42. In exemplary embodiments, heating of the diesel engine 42 is carried out by heating the coolant and/or oil and/or air inducted into the engine. The controller is configured to direct energy from the battery 50 to the engine heating element 52 in order to raise the temperature(s) of the diesel engine 42. In exemplary embodiments, the engine is heated to a predetermined temperature. In exemplary embodiments the oil and/or coolant may be heated to a temperature in the range of 40 to 80° C., for example 60° C. For example, the air may be heated to a temperature in the range of 10 to 40° C., e.g. 25° C. Heating the engine in this way ensures that the engine can be started in a clean and safe mode.

The engine system 40 is arranged so to determine an operating temperature of the after-treatment arrangement 46 e.g. an exhaust gas temperature, and to determine an engine temperature(s) of the diesel engine 42. Any suitable means can be used to determine these temperatures, for example temperature sensors provided at a suitable position in the engine system.

The engine system 40 also includes a motor generator 54, which is arranged to provide power to the tracks 16 via a suitable transmission and/or the driveline 44. In this embodiment, the driveline 44 comprises a hydraulic pump mechanically driven by the motor generator 54 and/or the engine 42 in the superstructure 14 and fluidly coupled to hydraulic motors arranged to drive each track 16 in the chassis 12 via pipes and a rotary coupling (not shown) The motor generator 54 and/or the engine 42 is also arranged to power the hydraulic pump 44 to enable an operator to manipulate the working arms by pumping hydraulic fluid into the hydraulic rams 32, 34, 36 and thereby perform working operations. The hydraulic pump of the driveline may be the same hydraulic pump 44 used to enable manipulation of the working arms, or a different hydraulic pump. In other embodiments, the transmission may alternatively comprise one or more of a gearbox and/or torque converter, and may be connected to the ground engaging structure by a driveline comprising a suitable arrangement of drive shafts and differentials.

Accordingly, the vehicle can be driven via the motor generator in an electric mode, via the diesel engine 42 in an engine mode, or by a combination of both modes.

FIG. 2 shows a schematic diagram of the engine system 40 in which the arrows correspond to the available routes for energy to be supplied around the system.

In an exemplary embodiment, the excavator 10 is a 20-30 tonne excavator, the diesel engine 42 is a 150 kW engine, the motor generator is a 25 kW motor generator and the battery is a 20 kWh battery. The system disclosed herein can be used in such an exemplary embodiment when the excavator is operating under the normal duty cycle expected for an excavator of this size. The battery 50 can be any electrical energy storage medium, for example a lithium ion battery, a combination of a lithium ion battery and capacitors, or any other suitable medium. In alternative embodiments, any other suitable combination of engine system components may be used.

When in use, the engine system 40 operates as follows.

Figure 3:
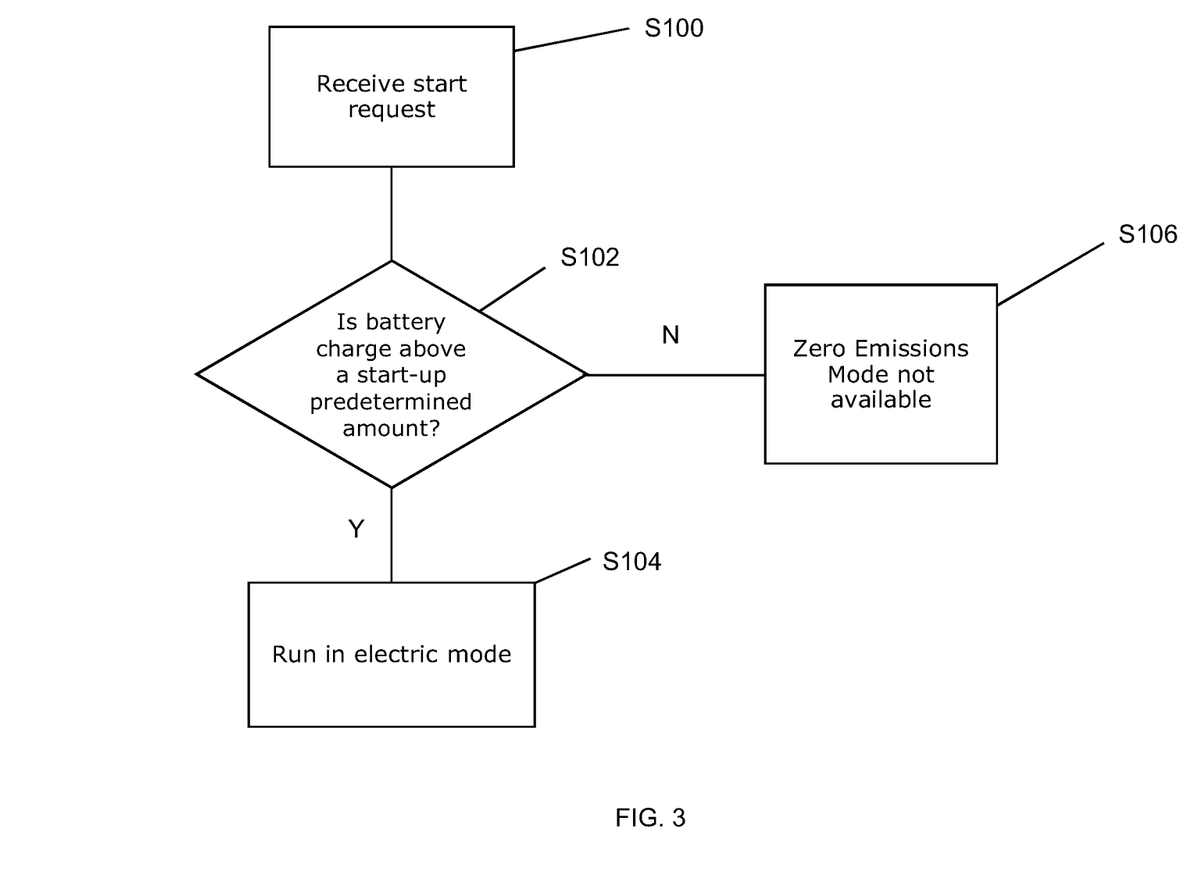
FIG. 3 illustrates a start-up process of the engine system of FIG. 2.

With reference to FIG. 3, when an operator starts the vehicle, the controller receives an input corresponding to a request to start the engine system 40. This is illustrated at step S100 of FIG. 3. Once this request has been received, the controller determines whether the charge in the battery 50 is above a start-up predetermined amount. This is shown in step S102. For example, the start-up predetermined amount of charge in the battery may be 20-100%, e.g. 50% of full charge. If the battery charge is at or above the start-up predetermined amount, the engine system 40 is run in the electric mode. This is shown in step S104. Therefore the controller directs the battery 50 to supply energy to the motor generator 54 to drive the driveline and hydraulic pump 44.

If it is determined at step S102 that the battery charge is below the start-up predetermined amount, then there is insufficient charge to run the engine system 40 in the electric mode. In this case, there will be insufficient charge to heat the diesel engine 42 and the after-treatment arrangement 46 as required by the system. Therefore if in an environment where near zero emissions are mandated (e.g. a zero emissions zone of a city) the battery must either be replaced or charged before the vehicle can be used, to ensure reduced or negligible emissions from the vehicle. If outside of such a zone, the vehicle may be operated in a non-zero emissions mode. The vehicle may be fitted with an manual override system to determine whether a non-zero emissions mode, or the vehicle may be fitted with a positioning device (such as a GPS system) and the vehicle may be geo-fenced so that zero emissions running is the only permissible operating mode in certain locations. This is indicated at FIG. 3 at step S106 which describes that the "zero" emissions engine system mode is not available.

Figure 4:
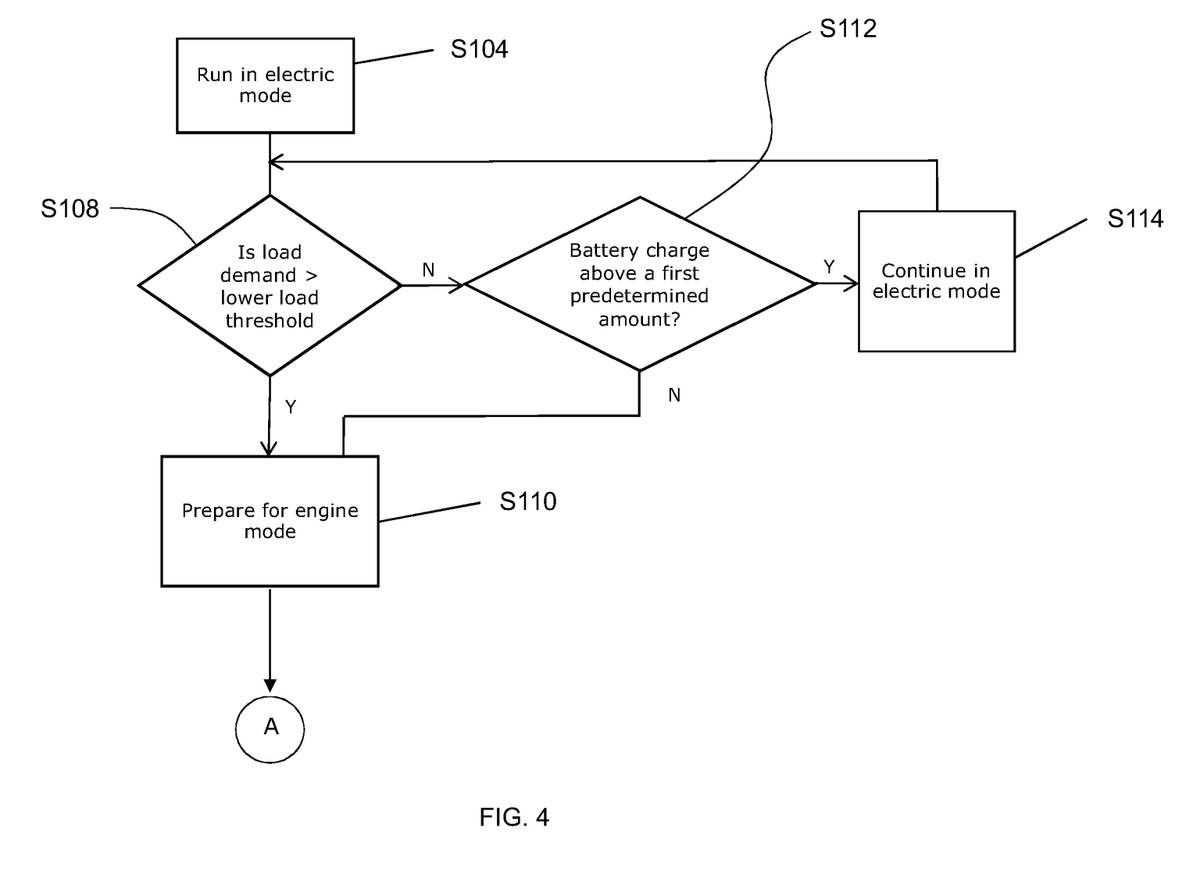
FIG. 4 illustrates operation of the engine system of FIG. 2 depending on the load demand on the vehicle.

With reference to FIG. 4, when the engine system 40 is running in electric mode, the controller can also determine the load demand being placed on the vehicle S108. At this step, the controller determines whether the load demand is higher than a lower load threshold. In exemplary embodiments, the lower load threshold is 20%. If it is higher than a lower load threshold, then the engine system is prepared for running in the engine mode S110. This will be described in more detail below.

If the load demand is lower than the lower load threshold, the engine system can continue to run in the electric mode. This depends on the charge available in the battery 50, therefore the controller determines whether the battery charge is above a first predetermined amount S112. For example, the first predetermined amount may be 10-50% of full charge, e.g. 20%.

If the battery charge is above the first predetermined amount, then the vehicle will continue to run in the electric mode S114. If the battery charge is below the first predetermined amount, then the controller directs the engine system 40 to prepare for engine mode S110. In this way, the remaining battery charge is used to prepare the diesel engine 42 and the after-treatment arrangement 46 to run with reduced or approximately zero emissions, by providing energy to heat the respective heating elements. Additionally, starting the engine 42 enables the battery to be charged.

Figure 5:
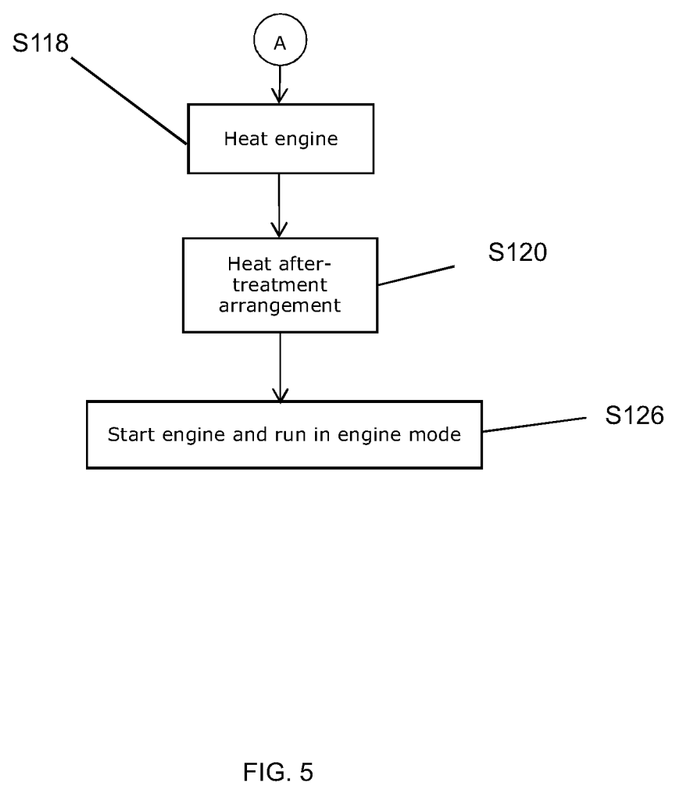
FIG. 5 illustrates a process of switching from an electric mode to an engine mode in the engine system of FIG. 2.

With reference to FIG. 5, when the engine system 40 is preparing to run in engine mode, the after-treatment arrangement 46 and the diesel engine 42 are first brought up to temperature to ensure reduced or negligible emissions from the vehicle while the engine is running. Firstly, the engine is heated S118 e.g. the coolant, oil and/or inducted air are heated. In some embodiments, the system 40 comprises sensors for determining the temperature(s) of the engine. In some embodiments, the system 40 calculates a projected heating time required to bring the engine 42 up to temperature.

As the engine is being brought up to temperature, the after-treatment arrangement 46 is also heated S120. In exemplary embodiments, the system 40 calculates a projected heating time required to bring the after-treatment system 46 up to temperature. In some embodiments, the system 40 comprises sensors for determining the temperature(s) of the after-treatment system 46. In exemplary embodiments the SCR catalyst is heated and then, just before or when the engine starts, the exhaust is also heated.

Once the engine 42 and the after-treatment arrangement 46 have been brought up to temperature (e.g. been heated for a projected amount of time) the controller directs the diesel engine to start and to power the driveline and hydraulic pump 44 (S126).

Since the diesel engine 42 and the after-treatment arrangement 46 are heated to an optimal temperature, emissions from the vehicle when the diesel engine is running are vastly reduced and can be negligible.

Once the engine and the after-treatment arrangement have been heated and the engine started, the controller directs the battery to cease supply of energy to the after-treatment heating element and the engine heating element. The battery may gradually cease supply of energy to the after-treatment heating element and/or the engine heating element. In some circumstances, the supply of energy to heat the after-treatment arrangement may be stopped prior to or after the supply of energy to heat the engine is stopped. In this way, heating can be tailored so that the required temperature of the after-treatment arrangement and/or the engine is maintained.

Figure 6:
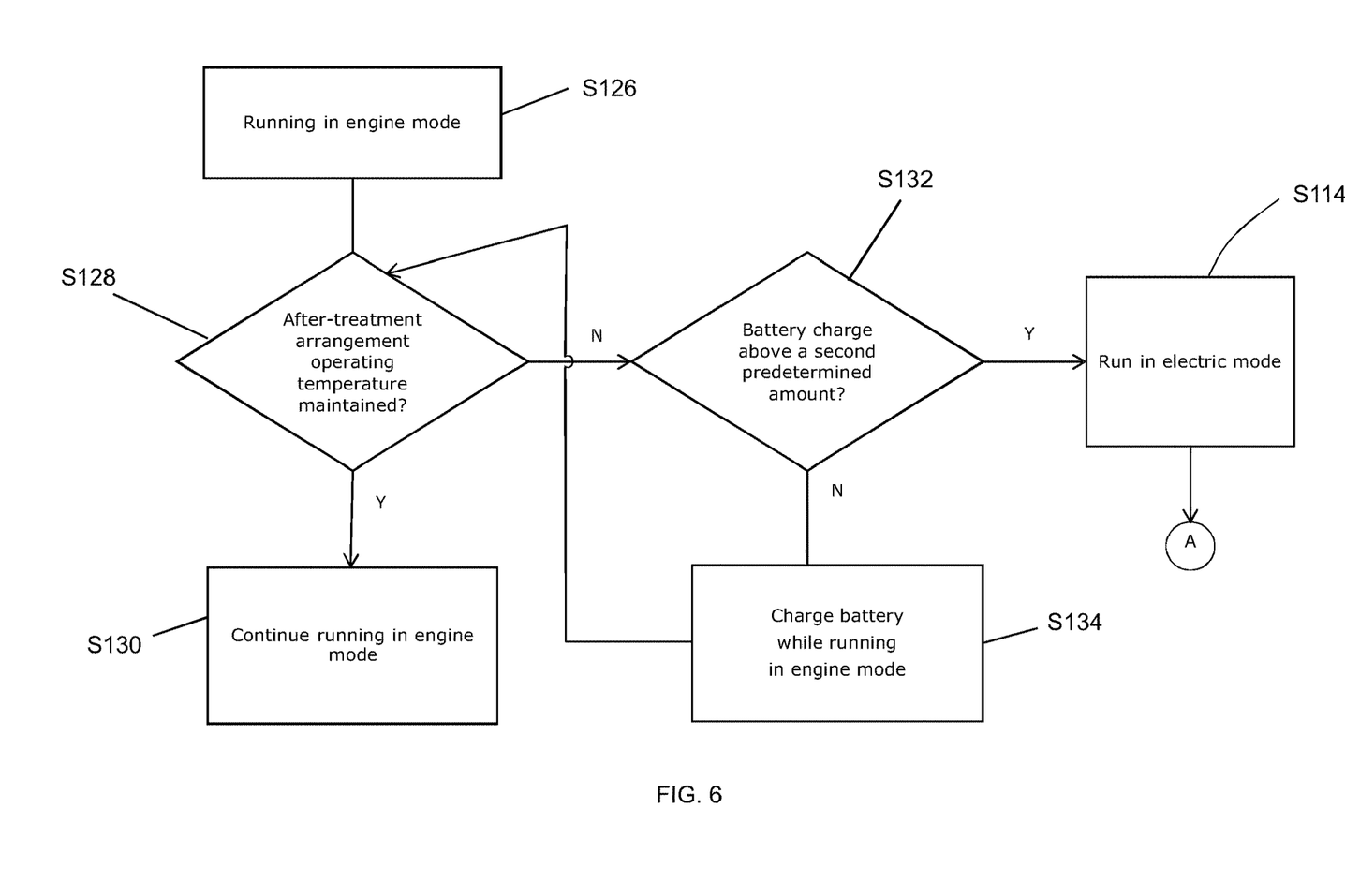
FIG. 6 illustrates operation of the engine system of FIG. 2 depending on the operating temperature of the after-treatment arrangement.

With reference to FIG. 6, when running in engine mode, S126, the controller continues to monitor the after-treatment arrangement 46 operating temperature S128. Whilst this operating temperature remains sufficiently high (e.g. above a predetermined threshold and/or at an approximately consistent temperature), the engine system continues to run in the engine mode S130. If the operating temperature is determined by the system to be decreasing and/or is the operating temperature is determined to have dropped below a predetermined threshold, the controller then determines the amount of charge in the battery S132. If the battery charge is above a second predetermined amount, then the controller directs the engine system 40 to run in the electric mode, i.e. the controller directs the battery 50 to provide energy to the motor generator 54 to drive the driveline and hydraulic pump 44. If the battery charge is below a second predetermined amount, then the controller directs the diesel engine 42 to also charge the battery 50 via motor generator 54 (S134). This increases the load on the diesel engine 42 and so acts to increase the operating temperature of the after-treatment arrangement 46. In exemplary embodiments, the second predetermined amount may be 50-100% of full charge, e.g. 90%. The system is also configured such that if the load demand on the vehicle is above an upper load threshold, the controller may direct the system to run in both the electric mode and the engine mode in order to meet high load demands. For example, the upper load threshold may be above that which can be provided by the engine alone.

In some embodiments, the operating temperature of the after-treatment arrangement 46 is determined based on a temperature of the exhaust gases from the diesel engine. In other embodiments, the operating temperature of the after-treatment arrangement is projected rather than directly measured.

The motor generator 54 is also configured to generate electrical energy from engine overrun and/or vehicle braking and transfer this to the battery 50, in order to charge the battery.

In exemplary embodiments the battery 50 may additionally be charged by connection to an external charger (e.g. connection to mains electricity) whilst mounted on the vehicle, and or the battery may be removed from the vehicle and replaced with a charged battery. The depleted battery may be charged off the vehicle.

Figure 7:
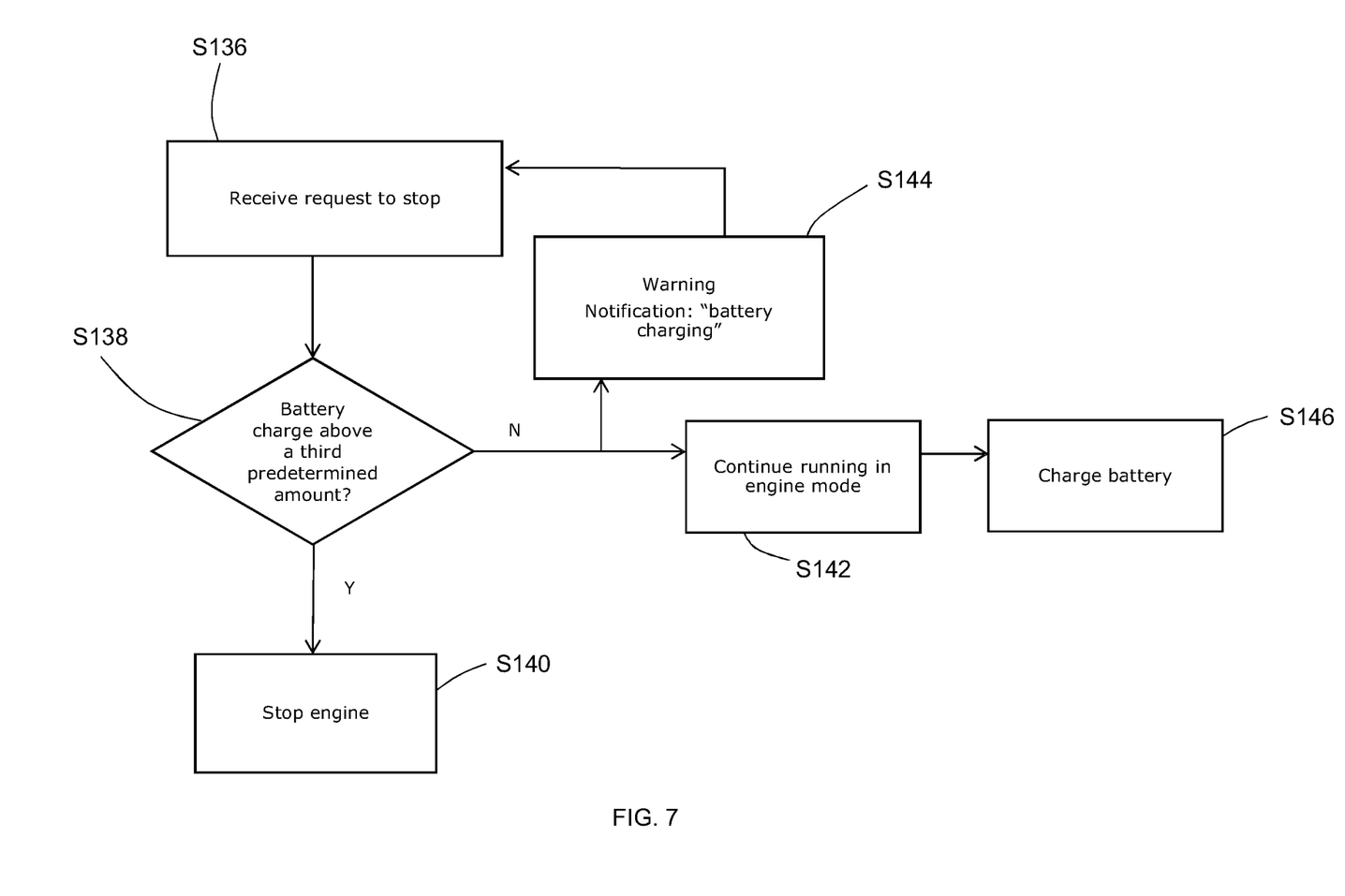
FIG. 7 illustrates a switch-off process of the engine system of FIG. 2.

With reference to FIG. 7, when the operator switches off the vehicle, the controller receives a request to stop the engine system S136. In the case where the vehicle is operating in engine mode, the controller determines whether the battery charge is above a third predetermined amount, S138. For example, the third predetermined amount may be in the range of 50-100%, e.g. 90%.

If the battery is sufficiently charged, then the engine is stopped S140. If the battery is not sufficiently charged, the controller directs the engine to continue running S142 and notifies the user that their request to stop the vehicle has been declined S144 due to the need to charge the battery. By continuing running the engine, the controller can direct the engine to charge the battery 50 S146 via the motor generator 54. This ensures that the battery is sufficiently charged for the next use of the vehicle. Thus the scenario described above in relation to step S106 would not normally be expect to occur in normal operating conditions. An example of when it may occur could be if the battery charge becomes depleted after an extended period when the vehicle is not used.

In some embodiments, an emergency override mechanism is provided. This enables an operator to force the engine to be stopped.

Although the disclosure has been described above with reference to one or more embodiments, it will be appreciated that various changes or modifications may be made without departing from the scope of the invention as defined in the appended claims.

The invention claimed is:

1. An off-highway vehicle comprising:
an engine system, the engine system comprising:
a. a diesel engine configured to drive a driveline of the vehicle;
b. an after-treatment arrangement configured to reduce emissions from the engine system;
c. an after-treatment heating element configured to raise an operating temperature of the after-treatment arrangement;
d. an electric energy storage device;
e. a controller configured to direct energy from the electric energy storage device to the after-treatment heating element in order to raise the operating temperature of the after-treatment arrangement; and
f. a motor generator configured to drive the driveline of the vehicle, such that the engine system is configured to drive the driveline of the vehicle via the motor generator in an electric mode, via the diesel engine in an engine mode, or in a combination of both modes;
wherein the controller is configured to determine a load demand on the system, and wherein:
if the demand is determined to be below a lower load threshold, then the controller directs the system to drive the driveline in the electric mode;
if the demand is above the lower load threshold and below an upper load threshold, the controller directs the system to drive the driveline in the engine mode; and if the demand is above the upper load threshold, the controller directs the system to drive the driveline in a combination of both the electric mode and the engine mode,
wherein the system is configured to determine the operating temperature of the after-treatment system and, when the system is operating in the engine mode, when the operating temperature is determined to be decreasing and/or when the determined operating temperature has reached a pre-determined minimum temperature, the controller is configured to direct the engine to also provide mechanical energy to the motor generator, for conversion to electrical energy and storage in the electric energy storage device.

2. The off-highway vehicle according to claim 1, wherein the system further comprises an engine heating element configured to heat the diesel engine, and wherein the controller is configured to direct energy from the electric energy storage device to the engine heating element in order to raise the temperature of the diesel engine.

3. The off-highway vehicle according to claim 1, wherein the system is configured to heat the after-treatment arrangement and/or the engine prior to the controller directing the diesel engine to drive the driveline.

4. The off-highway vehicle according to claim 1, wherein, prior to and/or during heating of the after-treatment arrangement and/or the engine, the controller directs energy from the electric energy storage device to the motor generator to drive the driveline in the electric mode.

5. The off-highway vehicle according to claim 1, wherein upon receipt of an input corresponding to a request to start the vehicle, the controller directs energy from the electric energy storage device to the motor generator to drive the driveline in the electric mode.

6. The off-highway vehicle according to claim 1, wherein the controller is configured to direct the system to switch from the electric mode to the engine mode, wherein switching from the electric mode to the engine mode comprises:
  a. pre-heating the after-treatment arrangement and/or the engine, and
  b. following pre-heating, the controller is configured to cause the engine to drive the driveline in the engine mode;
  wherein the pre-heating the after-treatment arrangement and/or the engine comprises the controller directing energy from the electric energy storage device to the after-treatment heating element and/or the engine heating element for a respective pre-determined time period.

7. The off-highway vehicle according to claim 6, wherein the pre-heating the after-treatment arrangement and/or the engine comprises the controller directing energy from the electric energy storage device to the after-treatment heating element and/or the engine heating element until the after-treatment arrangement and/or the engine reach a pre-determined temperature.

8. The off-highway vehicle according to claim 6, wherein, when the system is running in electric mode, if the amount of charge in the electric energy storage device is below a first predetermined amount, the controller directs the system to switch from the electric mode to the engine mode.

9. The off-highway vehicle according to claim 1, wherein, the operating temperature of the after-treatment arrangement is determined based on a temperature of the exhaust gases from the diesel engine.

10. The off-highway vehicle according to claim 1, wherein the system is configured to determine an amount of charge in the electric energy storage device, and wherein when the system is running in the engine mode and upon receipt of an input corresponding to a request to stop the vehicle:
  a. if the amount of charge is above a third predetermined amount, the controller directs the engine to switch off; and
  b. if the amount of charge is below a third predetermined amount, the controller directs the engine to keep running to provide mechanical energy to the motor generator, for conversion to electrical energy and storage in the electric energy storage device.

11. The off-highway vehicle according to claim 1, wherein the motor generator is configured to generate electrical energy from engine overrun and/or vehicle braking and transfer this to the electric energy storage device.

12. The off-highway vehicle according to claim 1, wherein the controller is configured to direct energy to the after-treatment heating element and/or to the engine heating element upon receipt of an input corresponding to a request to start the vehicle.

13. The off-highway vehicle according to claim 1, wherein the system is configured to determine an operating temperature of the after-treatment arrangement and/or an engine temperature of the diesel engine, and wherein, when the determined operating temperature of the after-treatment system and/or the determined engine temperature meet a respective predetermined threshold, the controller directs the diesel engine to drive the driveline.

14. The off-highway vehicle according to claim 1, wherein the after-treatment arrangement comprises a Diesel Particular Filter (DPF) and/or a Selective Catalytic Reduction (SCR) arrangement.

15. The off-highway vehicle according to claim 1, wherein heating the engine comprises heating a coolant and/or an oil and/or air inducted into the engine.

16. The off-highway vehicle according to claim 1, wherein, after the controller directs the diesel engine to drive the driveline, the controller directs the electric energy storage device to cease supply of energy to the after-treatment heating element and/or the engine heating element.

17. The off-highway vehicle according to claim 1, wherein the controller directs the electric energy storage device to gradually cease supply of energy to the after-treatment heating element and/or the engine heating element.

18. An off-highway vehicle comprising:
an engine system, the engine system comprising:
  a. a diesel engine configured to drive a driveline of the vehicle;
  b. an after-treatment arrangement configured to reduce emissions from the engine system;
  c. an after-treatment heating element configured to raise an operating temperature of the after-treatment arrangement;
  d. an electric energy storage device;
  e. a controller configured to direct energy from the electric energy storage device to the after-treatment heating element in order to raise the operating temperature of the after-treatment arrangement; and
  f. a motor generator configured to drive the driveline of the vehicle, such that the engine system is configured to drive the driveline of the vehicle via the motor generator in an electric mode, via the diesel engine in an engine mode, or in a combination of both modes;
wherein the controller is configured to determine a load demand on the system, and wherein:

if the demand is determined to be below a lower load threshold, then the controller directs the system to drive the driveline in the electric mode;

if the demand is above the lower load threshold and below an upper load threshold, the controller directs the system to drive the driveline in the engine mode; and if the demand is above the upper load threshold, the controller directs the system to drive the driveline in a combination of both the electric mode and the engine mode, wherein the system is configured to determine the operating temperature of the after-treatment system and, when the system is operating in the engine mode, when the operating temperature is determined to be decreasing and/or when the determined operating temperature has reached a pre-determined minimum temperature, the controller is configured to direct the engine to also provide mechanical energy to the motor generator, for conversion to electrical energy and storage in the electric energy storage device; and wherein the after-treatment heating element is configured to raise the operating temperature of the after-treatment arrangement by heating an exhaust from the diesel engine and/or by heating an SCR catalyst.

\* \* \* \* \*